(12) United States Patent
Tomioka et al.

(10) Patent No.: US 8,570,337 B2
(45) Date of Patent: Oct. 29, 2013

(54) COLOR CORRECTOR, VIDEO DISPLAY DEVICE, AND COLOR CORRECTION METHOD

(75) Inventors: Shinichi Tomioka, Osaka (JP); Nobuko Fujita, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/558,993

(22) Filed: Jul. 26, 2012

(65) Prior Publication Data

US 2012/0287145 A1    Nov. 15, 2012

Related U.S. Application Data

(63) Continuation of application No. PCT/JP2011/000747, filed on Feb. 10, 2011.

(30) Foreign Application Priority Data

Feb. 12, 2010   (JP) ................................. 2010-028967

(51) Int. Cl.
*G09G 5/02*   (2006.01)
(52) U.S. Cl.
USPC ........... 345/589; 345/590; 345/591; 345/592; 382/167
(58) Field of Classification Search
USPC ................... 345/589–592; 382/167
See application file for complete search history.

(56) References Cited

U.S. PATENT DOCUMENTS

| 5,384,601 | A | 1/1995 | Yamashita et al. |
| 6,594,388 | B1* | 7/2003 | Gindele et al. ................ 382/167 |
| 2006/0013478 | A1 | 1/2006 | Ito et al. |
| 2006/0132873 | A1 | 6/2006 | Ohkawa |
| 2009/0208101 | A1* | 8/2009 | Harigai ......................... 382/167 |
| 2010/0002010 | A1* | 1/2010 | Li et al. ........................ 345/590 |
| 2010/0054594 | A1* | 3/2010 | Sambongi et al. ............ 382/167 |
| 2011/0234622 | A1* | 9/2011 | Fujita et al. .................. 345/591 |

FOREIGN PATENT DOCUMENTS

| JP | 2003-224860 | 8/2003 |
| JP | 2003-224860 A | 8/2003 |

OTHER PUBLICATIONS

International Search Report issued in International Patent Application No. PCT/JP2011/000747 dated Apr. 12, 2011.

* cited by examiner

*Primary Examiner* — Xiao M. Wu
*Assistant Examiner* — Todd Buttram
(74) *Attorney, Agent, or Firm* — McDermott Will & Emery LLP

(57) ABSTRACT

Color correction according to the present disclosure performs correction by adding a predetermined correction value to an input value of a component to be corrected, which is one of a plurality of components for representing a color with a predetermined color space, and outputs a corrected value. The color correction includes calculating an unadjusted correction value based on the input value; and adjusting the unadjusted correction value calculated in the calculating the unadjusted correction value so that the corrected value does not decrease with an increase in the input value, and outputting the adjusted value as the predetermined correction value.

14 Claims, 5 Drawing Sheets

COLOR CORRECTOR, VIDEO DISPLAY DEVICE, AND COLOR CORRECTION METHOD

CROSS-REFERENCE TO RELATED APPLICATION

This is a continuation of PCT International Application PCT/JP2011/000747 filed on Feb. 10, 2011, which claims priority to Japanese Patent Application No. 2010-028967 filed on Feb. 12, 2010. The disclosures of these applications including the specifications, the drawings, and the claims are hereby incorporated by reference in their entirety.

BACKGROUND

The present disclosure relates to techniques of performing correction by adding a predetermined correction value to an input value of one of a plurality of components for representing a color with a predetermined color space.

The video display device shown in Japanese Patent Publication No. 2003-224860 includes a specific hue correction circuit which adds a correction value to an input hue value and outputs an output hue value. As shown in FIG. 5(b) of Japanese Patent Publication No. 2003-224860, the correction value to be added is represented by a graph, in which the vertical axis represents the correction value, and the horizontal axis represents the input hue value. While the added correction value is 0 where the input hue value is out of a predetermined correction target range, and shifts in a trapezoidal shape where the input hue value falls within the correction target range.

SUMMARY

However, in Japanese Patent Publication No. 2003-224860, as shown in FIG. 5(b), when the input hue value is within the predetermined range, the graph of the correction value has a negative slope. Within the range, as shown in FIG. 6(a) of Japanese Patent Publication No. 2003-224860, the output hue value decreases with an increase in the input hue value. Such a characteristic of a specific hue correction circuit causes the problem that a video image is not correctly displayed. For example, gradual gradation of an image of sunset etc. is displayed in a wavy manner.

Such a problem occurs when correcting other components, such as not only hue but also saturation and brightness, for representing a color with a color space.

In view of the problem, it is an objective of the present disclosure to perform color correction so that an image is correctly displayed.

In order to achieve the objective, color correction according to an aspect of the present disclosure performs color correction of a video input signal including a plurality of components for representing a color with a predetermined color space; and performs correction by adding a predetermined correction value to an input value of one of the components to be corrected where the input value ranges from a correction region minimum value to a correction region maximum value which is greater than the correction region minimum value, and outputs a corrected value. The color correction includes calculating an unadjusted correction value based on the input value; and adjusting the unadjusted correction value calculated in the calculating the unadjusted correction value so that the corrected value does not decrease with an increase in the input value and ranges from the correction region minimum value to the correction region maximum value, and outputting the adjusted value as the predetermined correction value.

According to this aspect, the correction value used in the correction is adjusted in the adjusting the unadjusted correction value so that the corrected value of the component to be corrected does not decrease with an increase in the input value. This reduces incorrect display such as wavy display of gradual gradation. Therefore, color correction is performed so that an image is correctly displayed.

The present disclosure performs color correction so that an image is correctly displayed.

DETAILED DESCRIPTION

Embodiments of the present disclosure will be described hereinafter with reference to the drawings.

Figure 1:
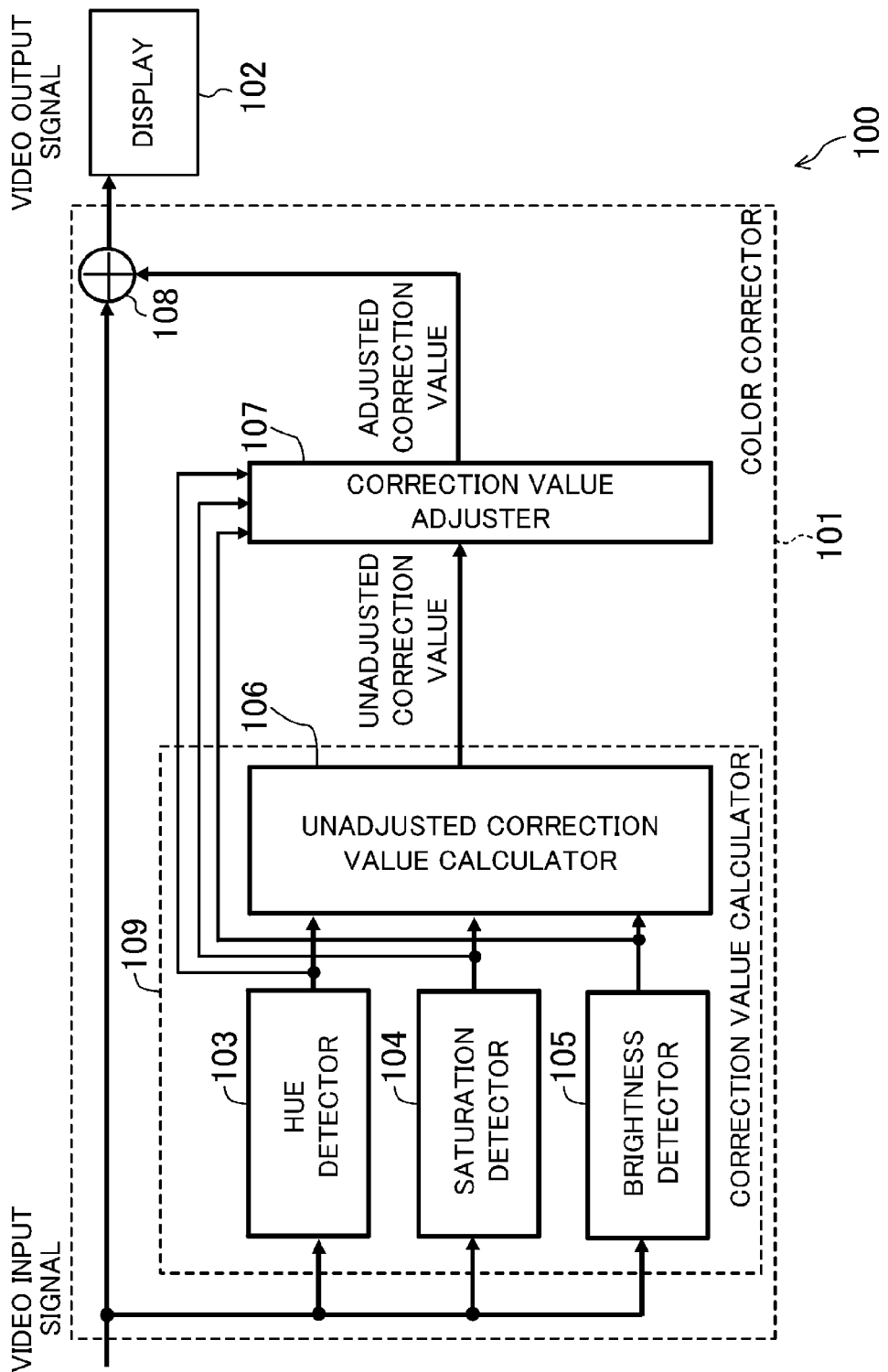
FIG. 1 is a block diagram illustrating the configuration of a video display device according to an embodiment of the present disclosure.

FIG. 1 illustrates a video display device 100 according to the embodiment of the present disclosure.

The video display device 100 includes a color corrector 101 and a display 102.

The color corrector 101 receives a video input signal, performs color correction of the video input signal, and outputs a video output signal. The video input signal and the video output signal, which are an input and an output of the color corrector 101, represent a color with an HSV space. Each of the video input signal and the video output signal includes a value representing a hue component, a value representing a saturation component, and a value representing a brightness component. Specifically, the color correction by the color corrector 101 is performed by adding an adjusted correction value, which will be described later, to the value representing the hue component (i.e., an input value of the component to be corrected, hereinafter referred to as an input hue component) included in the video input signal. The color corrector 101 includes a hue detector 103, a saturation detector 104, a brightness detector 105, an unadjusted correction value calculator 106, a correction value adjuster 107, and an adder 108. The color corrector 101 is an integrated circuit. The functions of the sections forming the color corrector 101 may be implemented by executing a program with a central processing unit (CPU).

Figure 2:
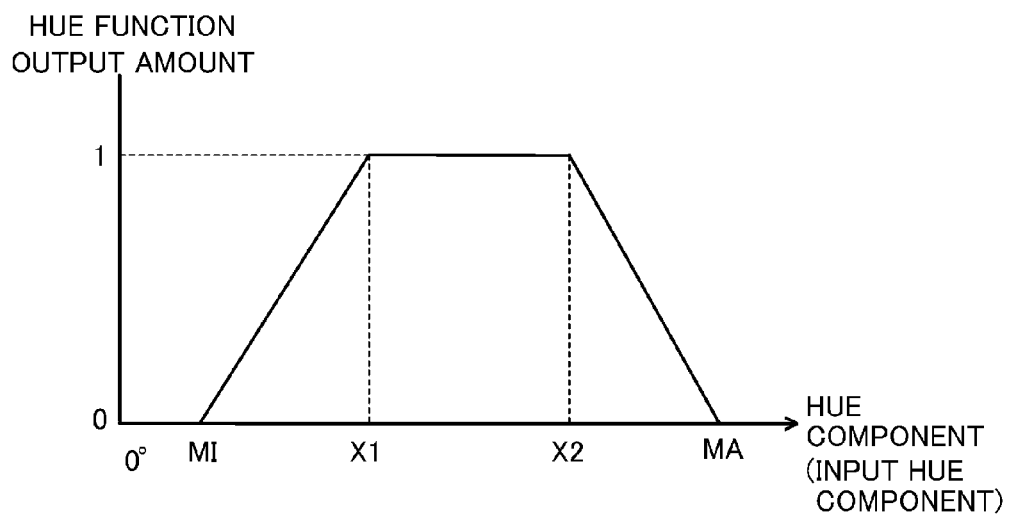
FIG. 2 is a graph illustrating a hue detection function according to the embodiment of the present disclosure.

The hue detector 103 calculates a hue function output amount according to the input hue component based on a hue detection function shown in FIG. 2. The hue function output amount has a positive value where the input hue component has a value ranging from a correction region minimum value MI to a correction region minimum value MA, and is 0 in the other cases.

Figure 3:
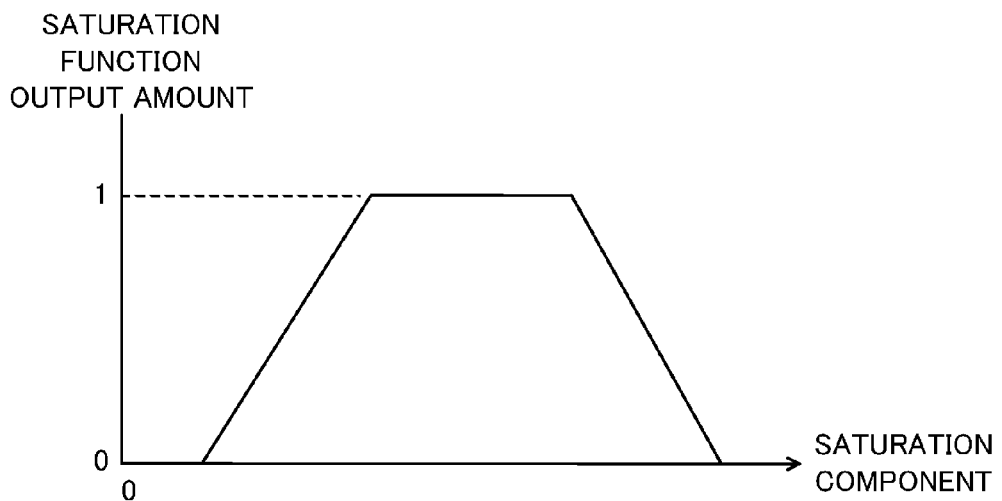
FIG. 3 is a graph illustrating a saturation detection function according to the embodiment of the present disclosure.

The saturation detector 104 calculates a saturation function output amount according to the saturation component included in the video input signal based on a saturation detection function shown in FIG. 3.

Figure 4:
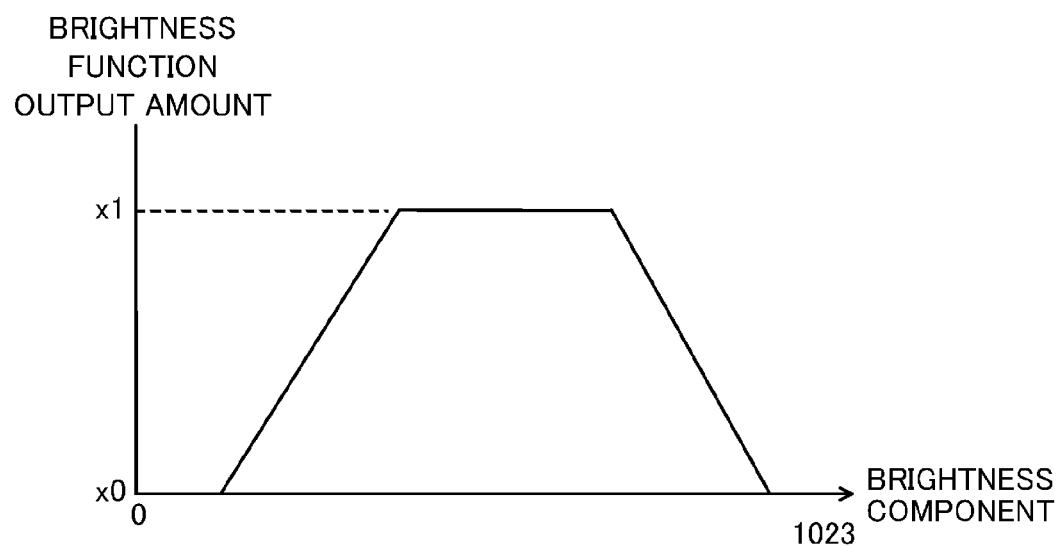
FIG. 4 is a graph illustrating a brightness detection function according to the embodiment of the present disclosure.

The brightness detector 105 calculates a brightness function output amount according to the brightness component included in the video input signal based on a brightness detection function shown in FIG. 4.

The unadjusted correction value calculator 106 calculates the unadjusted correction value by multiplying the hue function output amount calculated by the hue detector 103 by the saturation function output amount calculated by the saturation detector 104 by the brightness function output amount calculated by the brightness detector 105 by a predetermined offset value OFS. The calculation is represented by the following equation (1).

$$\text{Unadjusted Correction Value} = \text{Hue Function Output Amount} \times \text{Saturation Function Output Amount} \times \text{Brightness Function Output Amount} \times OFS \quad (1)$$

The unadjusted correction value is the value obtained by multiplying the hue function output amount by a predetermined number (Z) where the saturation function output amount and the brightness function output amount have both positive values. Assume that the OFS is set to a positive value. Where the input hue component is the MI or less, the unadjusted correction value is 0. Where the input hue component has a value ranging from the MI to a predetermined medium value X1, where X1>MI, the unadjusted correction value shifts with a constant positive slope relative to the shift of the input hue component, and ranges from 0 to Z (i.e., the maximum correction value). Where the input hue component has a value ranging from the X1 to a predetermined medium value X2, where X2>X1, the unadjusted correction value is the Z (i.e., the maximum correction value). Where the input hue component has a value ranging from the X2 to the MA, where MA>X2, the unadjusted correction value shifts with a constant negative slope less than −1 relative to the input hue component, and ranges from the Z (i.e., the maximum correction value) to 0. Where the input hue component is the MA or more, the unadjusted correction value is 0. On the other hand, assume that the OFS is set to a negative value. Where the input hue component is the MI or less, the unadjusted correction value is 0. Where the input hue component has a value ranging from the MI to a predetermined medium value X1, where X1>MI, the unadjusted correction value shifts with a constant slope less than 1 relative to the shift of the input hue component, and ranges from 0 to Z (i.e., the minimum correction value). Where the input hue component has a value ranging from the X1 to a predetermined medium value X2, where X2>X1, the unadjusted correction value is the Z (i.e., the minimum correction value). Where the input hue component has a value ranging from the X2 to the MA, where MA>X2, the unadjusted correction value shifts with a constant positive slope relative to the input hue component, and ranges from the Z (i.e., the minimum correction value) to 0. Where the input hue component is the MA or more, the unadjusted correction value is 0.

The hue detector 103, the saturation detector 104, the brightness detector 105, and the unadjusted correction value calculator 106 form a correction value calculator 109.

The correction value adjuster 107 adjusts the unadjusted correction value calculated by the unadjusted correction value calculator 106 so that the hue component after correction does not decrease with an increase in the input hue component, and outputs the adjusted value as the adjusted correction value. The adjusted correction value is obtained by the following equations (2).

$$\text{Adjusted Correction Value} = +\text{MIN}\{|MA-(\text{Input Hue Component})|,|(\text{Unadjusted Correction Value})|\},$$
$$\text{Where } OFS \geq 0$$

$$\text{Adjusted Correction Value} = -\text{MIN}\{|(\text{Input Hue Component})-MI|,|(\text{Unadjusted Correction Value})|\},$$
$$\text{Where } OFS < 0 \quad (2)$$

The adder 108 adds the adjusted correction value calculated by the correction value adjuster 107 to the input hue component, and outputs the video output signal including the addition result as the hue component.

The display 102 displays a video image based on the video output signal output from the adder 108 of the color corrector 101.

Figure 5:
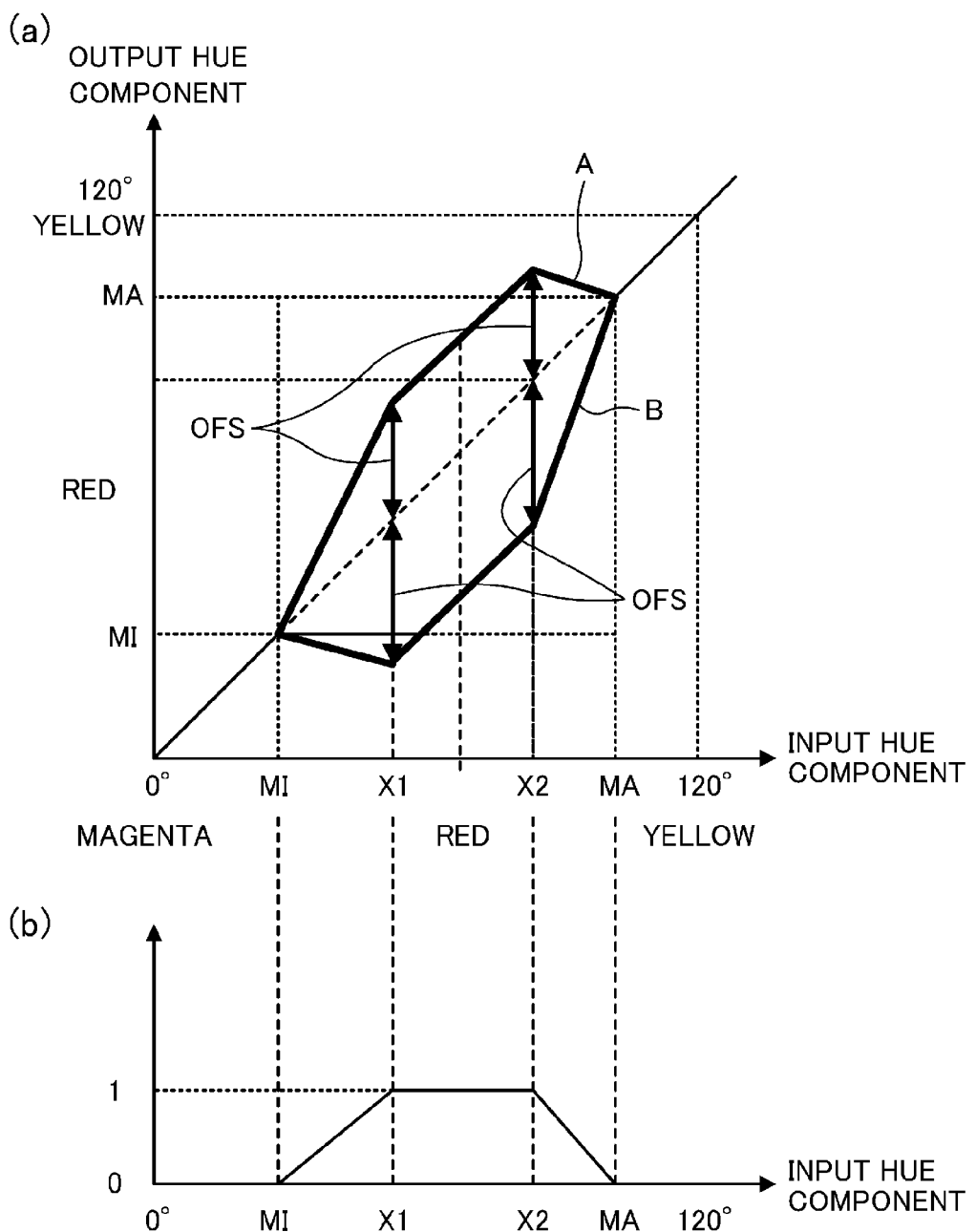
FIG. 5A is a graph illustrating the relationship between an output hue component and an input hue component where an unadjusted correction value is added to the input hue component.
FIG. 5B is a graph illustrating a hue detection function corresponding to the graph of FIG. 5A.

Assume that the saturation function output amount and the brightness function output amount are both 1. Where the adder 108 adds the unadjusted correction value calculated by the unadjusted correction value calculator 106 to the input hue component without any change, the relationship between the input hue component and the value of the hue component (hereinafter referred to as an output hue component) included in the video output signal is as shown in FIG. 5A. In the figure, A is an example where OFS>0, and B is an example where OFS<0.

In the relationship A, where the input hue component has a value within the range from X2 (a first value) to MA (a second value), the unadjusted correction value shifts with a slope less than −1 relative to the input hue component, and ranges from the OFS (i.e., the maximum correction value) to 0. Thus, at this time, the output hue component decreases with an increase in the input hue component. On the other hand, where the input hue component has a value out of the range from X2 to MA, the unadjusted correction value shifts with a slope of −1 or more relative to the input hue component, and has a value equal to or less than the maximum correction value. Thus, at this time, the output hue component increases with an increase in the input hue component.

In the relationship B, where the input hue component has a value ranging from MI (a first value) to X1 (a second value), the unadjusted correction value shifts with a slope less than −1 relative to the input hue component, and ranges from 0 to OFS (i.e., the minimum correction value). Thus, at this time, the output hue component decreases with an increase in the input hue component. On the other hand, where the input hue component has a value out of the range from MI to X1, the unadjusted correction value shifts with a slope of −1 or more relative to the input hue component, and has a value equal to or more than the minimum correction value. The output hue component increases with an increase in the input hue component. FIG. 5B illustrates the hue detection function corresponding to the graph of FIG. 5A.

Figure 6:
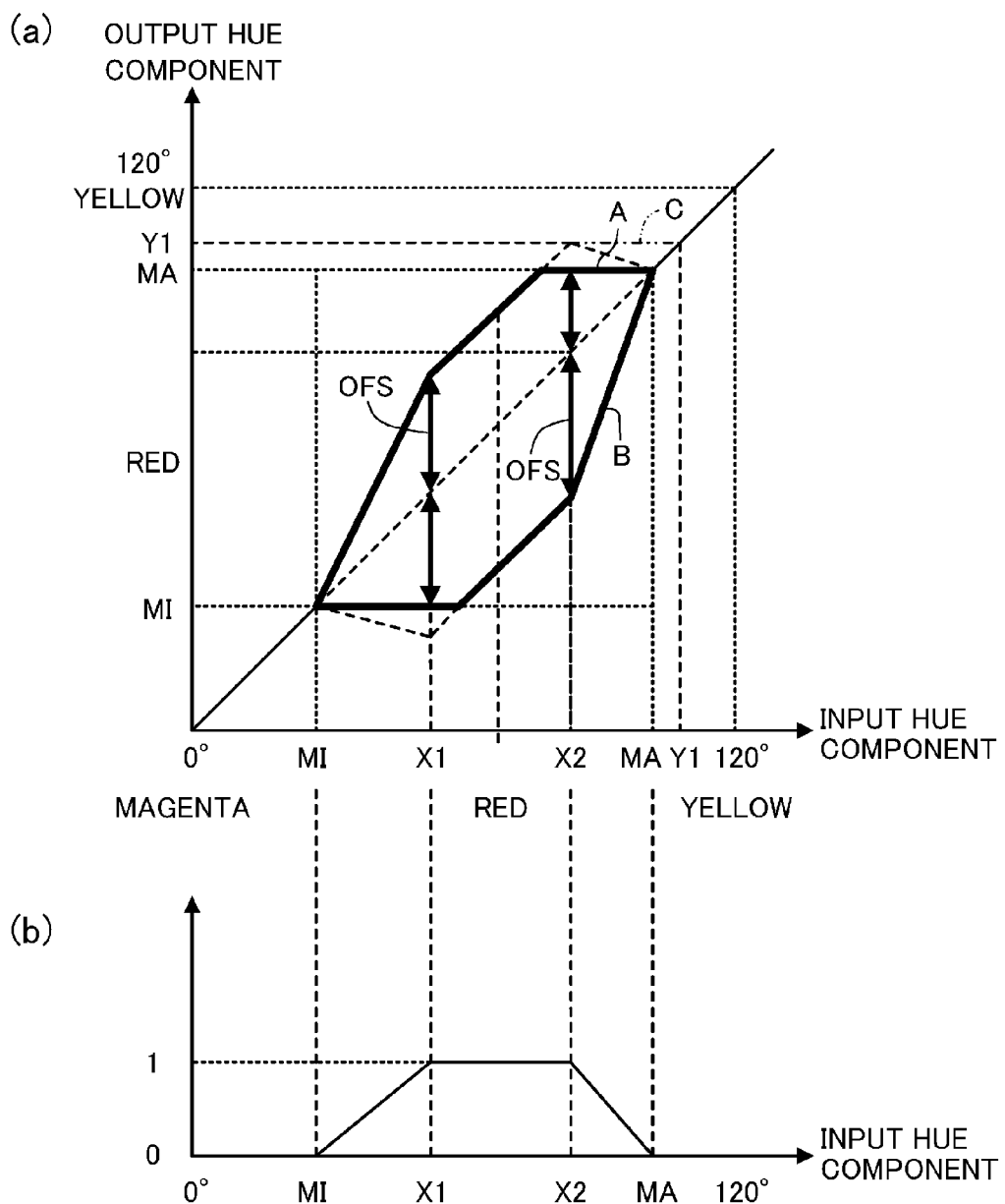
FIG. 6A is a graph illustrating the relationship between an output hue component and an input hue component according to the embodiment of the present disclosure.
FIG. 6B is a graph illustrating a hue detection function corresponding to the graph of FIG. 6A.

In the color corrector 101 according to this embodiment, the relationship between the output hue component and the input hue component is as shown in FIG. 6A. In the figure, A is an example where OFS>0, and B is an example where OFS<0. In the relationship A, where the input hue component has a value ranging from X2 to MA, the output hue component does not change even if the input hue component increases. Also, in the relationship B, where the input hue component has a value ranging from MI to X1, the output hue component does not change even if the input hue component increases. As such, the output hue component does not decrease with an increase in the input hue component, and thus, incorrect display such as wavy display of gradual gradation can be reduced, thereby correctly displaying a video image.

Next, operation of the video display device 100 will be described.

When the video display device 100 receives a video input signal, first, the hue detector 103 calculates a hue function output amount according to an input hue component based on a hue detection function. At the same time, the saturation detector 104 calculates a saturation function output amount according to a saturation component included in the video input signal based on a saturation detection function, and the brightness detector 105 calculates a brightness function output amount according to a brightness component included in the video input signal based on a brightness detection function.

Next, the unadjusted correction value calculator 106 calculates the unadjusted correction value by multiplying the hue function output amount by the saturation function output amount by the brightness function output amount by a predetermined offset value OFS. Based on the unadjusted correction value calculated by the unadjusted correction value calculator 106, the correction value adjuster 107 calculates the adjusted correction value in accordance with the above-described equations (2).

In this embodiment, only where |(Unadjusted Correction Value)| is more than |MA −(Input Hue Component)| and |(Input Hue Component)−MI|, a value having an absolute value smaller than the unadjusted correction value is used as the adjusted correction value. Where |(Unadjusted Correction Value)| is equal to or less than |MA−(Input Hue Component)| and |(Input Hue Component)|−MI|, the unadjusted correction value is used as the adjusted correction value without any change. Therefore, where |(Unadjusted Correction Value)| is not more than |MA−(Input Hue Component)| and |(Input Hue Component)−MI|, the hue component can be largely corrected with the adjusted correction value equal to the unadjusted correction value.

In this embodiment, where |(Unadjusted Correction Value)| is more than |MA−(Input Hue Component)| and |(Input Hue Component)−MI|, the correction value adjuster 107 reduces the adjusted correction value to be equal to |MA−(Input Hue Component)| and −|(Input Hue Component)−MI|. However, as long as correction can be made so that the output hue component does not decrease with an increase in the input hue component, how to adjust the adjusted correction value using the correction value adjuster 107 is not limited thereto.

For example, where the input hue component has a value between the input hue component (i.e., X2 in FIGS. 6A and 6B) when the hue function output amount starts decreasing, and the value (i.e., Y1 in FIGS. 6A and 6B) obtained by adding the unadjusted correction value where the input hue component is X2 to X2, the correction value adjuster 107 may output the value Y1, which is obtained by adding the unadjusted correction value where the input hue component is X2 to X2, as the adjusted correction value. In this case, the relationship between the input hue component and the output hue component where the input hue component has a value ranging from X2 to Y1 is as indicated by the dashed double-dotted line C in the relationship A in FIG. 6A.

In this embodiment, the hue detection function, the saturation detection function, and the brightness detection function are represented by a trapezoid graph. The functions may be represented by a graph in other shapes such as a shape with a curve.

In this embodiment, the absolute value of the unadjusted correction value shifts with a constant positive slope relative to the input hue component where the input hue component has a value ranging from the MI to the predetermined medium value X1, where X1>MI. The slope in this case may not be constant. Similarly, the slope where the input hue component has a value ranging from the X2 to MA, where MA>X2, may not be constant, either.

While the hue component is corrected in this embodiment, the present disclosure is also applicable to the case where the saturation component or the brightness component is corrected.

The present disclosure is also applicable to the case where a video input signal includes a plurality of components for representing a color with other color spaces such as a YUV space to correct the components.

While in this embodiment, an example has been described where the adjusted correction value is added to the input hue component by the adder 108, the "adding the predetermined correction value" recited in the claims includes subtracting a value obtained by applying the minus sign − to a predetermined correction value from the input hue component using a subtractor.

The color corrector, the video display device, and the color correction method according to the present disclosure are useful as a technique of correction by adding a predetermined correction value to an input value of one of a plurality of components for representing a color with a predetermined color space.

What is claimed is:

1. An integrated circuit for performing color correction of a video input signal including a plurality of components for representing a color with a predetermined color space, performing correction by adding a predetermined correction value to an input value of one of the components to be corrected where the input value ranges from a correction region minimum value to a correction region maximum value which is greater than the correction region minimum value, and outputting a corrected value, comprising:
   a correction value calculator configured to calculate an unadjusted correction value based on the input value; and
   a correction value adjuster configured to adjust the unadjusted correction value calculated by the correction value calculator so that the corrected value does not decrease with an increase in the input value and ranges from the correction region minimum value to the correction region maximum value, and output the adjusted value as the predetermined correction value,
   wherein the unadjusted correction value:
      ranges from a predetermined maximum correction value to 0 with a slope less than −1 relative to the input value, where the input value is within a range from a first value to a second value MA, and
      is equal to or less than the maximum correction value with a slope of −1 or more relative to the input value, where the input value is out of the range from the first value to the second value MA, and
   the correction value adjuster outputs the unadjusted correction value as the predetermined correction value without any change, where |(the unadjusted correction value)| is equal to or less than |MA−(the input value)|.

2. The integrated circuit of claim 1, wherein the correction value adjuster outputs |MA−(the input value)| as the predetermined correction value, where |(the unadjusted correction value)| is more than |MA−(the input value)|.

3. The integrated circuit of claim 1, wherein
the predetermined color space is an HSV space representing a color with a hue component, a saturation component, and a brightness component,
the component to be corrected is the hue component, and
the correction value calculator calculates, as the unadjusted correction value, a value obtained by multiplying a hue function output amount according to the hue component by a saturation function output amount according to the saturation component by a brightness function output amount according to the brightness component by a predetermined offset value.

4. A video display device comprising:
the integrated circuit of claim 1, and
a display configured to display a video image based on a video signal including a corrected value output from the color corrector as the component to be corrected.

5. An integrated circuit for performing color correction of a video input signal including a plurality of components for representing a color with a predetermined color space, performing correction by adding a predetermined correction value to an input value of one of the components to be corrected where the input value ranges from a correction region minimum value to a correction region maximum value which is greater than the correction region minimum value, and outputting a corrected value, comprising:
a correction value calculator configured to calculate an unadjusted correction value based on the input value; and
a correction value adjuster configured to adjust the unadjusted correction value calculated by the correction value calculator so that the corrected value does not decrease with an increase in the input value and ranges from the correction region minimum value to the correction region maximum value, and output the adjusted value as the predetermined correction value,
wherein the unadjusted correction value:
ranges from 0 to a predetermined minimum correction value with a slope less than −1 relative to the input value, where the input value is within a range from a first value MI to a second value, and
is equal to or more than the minimum correction value with a slope of −1 or more relative to the input value, where the input value is out of the range from the first value MI to the second value, and
the correction value adjuster outputs the unadjusted correction value as the predetermined correction value without any change, where |(the unadjusted correction value)| is equal to or less than |(the input value)−MI|.

6. The integrated circuit of claim 5, wherein the correction value adjuster outputs −|(the input value)−MI| as the predetermined correction value, where |(the unadjusted correction value)| is more than |(the input value)−MI|.

7. The integrated circuit of claim 5, wherein
the predetermined color space is an HSV space representing a color with a hue component, a saturation component, and a brightness component,
the component to be corrected is the hue component, and
the correction value calculator calculates, as the unadjusted correction value, a value obtained by multiplying a hue function output amount according to the hue component by a saturation function output amount according to the saturation component by a brightness function output amount according to the brightness component by a predetermined offset value.

8. A video display device comprising:
the integrated circuit of claim 5, and
a display configured to display a video image based on a video signal including a corrected value output from the color corrector as the component to be corrected.

9. A color correction method of performing color correction of a video input signal including a plurality of components for representing a color with a predetermined color space, performing correction by adding a predetermined correction value to an input value of one of the components to be corrected where the input value ranges from a correction region minimum value to a correction region maximum value which is greater than the correction region minimum value, and outputting a corrected value, the method comprising:
calculating, by a processor, an unadjusted correction value based on the input value; and
adjusting the unadjusted correction value calculated in the calculating the unadjusted correction value so that the corrected value does not decrease with an increase in the input value and ranges from the correction region minimum value to the correction region maximum value, and outputting the adjusted value as the predetermined correction value,
wherein the unadjusted correction value:
ranges from a predetermined maximum correction value to 0 with a slope less than −1 relative to the input value, where the input value is within a range from a first value to a second value MA, and
is equal to or less than the maximum correction value with a slope of −1 or more relative to the input value, where the input value is out of the range from the first value to the second value MA, and
in the adjusting the unadjusted correction value, the unadjusted correction value is output as the predetermined correction value without any change, where |(the unadjusted correction value)| is equal to or less than |MA−(the input value)|.

10. The method of claim 9, wherein in the adjusting the unadjusted correction value, |MA−(the input value)| is output as the predetermined correction value, where |(the unadjusted correction value)| is more than |MA−(the input value|.

11. The method of claim 9, wherein
the predetermined color space is an HSV space representing a color with a hue component, a saturation component, and a brightness component,
the component to be corrected is the hue component, and
in the calculating the unadjusted correction value, a value obtained by multiplying a hue function output amount according to the hue component by a saturation function output amount according to the saturation component by a brightness function output amount according to the brightness component by a predetermined offset value is calculated as the unadjusted correction value.

12. A color correction method of performing color correction of a video input signal including a plurality of components for representing a color with a predetermined color space, performing correction by adding a predetermined correction value to an input value of one of the components to be corrected where the input value ranges from a correction region minimum value to a correction region maximum value which is greater than the correction region minimum value, and outputting a corrected value, the method comprising:
calculating, by a processor, an unadjusted correction value based on the input value; and
adjusting the unadjusted correction value calculated in the calculating the unadjusted correction value so that the corrected value does not decrease with an increase in the input value and ranges from the correction region minimum value to the correction region maximum value, and outputting the adjusted value as the predetermined correction value, wherein the unadjusted correction value:
ranges from 0 to a predetermined minimum correction value with a slope less than −1 relative to the input value, where the input value is within a range from a first value MI to a second value, and
is equal to or more than the minimum correction value with a slope of −1 or more relative to the input value, where the input value is out of the range from the first value MI to the second value, and in the adjusting the unadjusted correction value, the unadjusted correction value is output as the predetermined correction value without any change, where |(the unadjusted correction value)| is equal to or less than |(the input value)−MI|.

13. The method of claim 12, wherein in the adjusting the unadjusted correction value, −|(the input value)−MI| is output as the predetermined correction value, where |(the unadjusted correction value)| is more than |(the input value)−MI|.

14. The method of claim 12, wherein
the predetermined color space is an HSV space representing a color with a hue component, a saturation component, and a brightness component,
the component to be corrected is the hue component, and
in the calculating the unadjusted correction value, a value obtained by multiplying a hue function output amount according to the hue component by a saturation function output amount according to the saturation component by a brightness function output amount according to the brightness component by a predetermined offset value is calculated as the unadjusted correction value.

* * * * *